Patented Dec. 21, 1926.

1,611,278

UNITED STATES PATENT OFFICE.

AUGUST H. PETERSEN, OF CUMBERLAND, MARYLAND, ASSIGNOR TO KELLY-SPRINGFIELD TIRE COMPANY, OF CUMBERLAND, MARYLAND, A CORPORATION OF NEW JERSEY.

RUBBER-LATEX COAGULUM.

No Drawing. Application filed September 26, 1922. Serial No. 590,667.

This invention relates, generally, to a process for coagulating rubber-containing latex in combination with certain ingredients, the resulting product representing a commercially useful compound capable of being eventually worked into definite form and stabilized by vulcanization. Such use, for instance, being in connection with the manufacture of rubber tires, mechanical rubber goods, and the like.

Specifically, this invention discloses a novel process for combining with the native latex a powdery ingredient, such as carbon black, which, when mixed with the latex in a certain manner, induces coagulation of the rubber content of the latex. The resulting coagulum showing a high degree of dispersion of the foreign substance throughout the mass of the coagulated rubber content of the latex, and attaining certain beneficial results, all as more fully developed throughout the following discussion.

Various methods of coagulation are commercially practiced. In South America, particularly, the practice followed is to collect the raw latex and thereafter accumulate a coagulum on a suitable paddle, effected by first dipping it into the latex and then exposing the thin liquid coating to astringent fumes characteristic of the products of combustion of certain fuel. On the eastern plantations it is usual to induce coagulation by introducing a suitable acid into the raw mass and agitating the whole until the coagulum is produced. In addition to the above methods, it is, of course, well known that coagulation takes place naturally, by merely exposing the latex to heat, either natural, or artificially generated.

In practicing the above method of coagulation only the crudest equipment imaginable is required and the resulting costs are proportionately small; but, where coagulation by fuming or by acid treatment is practiced, the resulting coagulum is more or less impure by reason of the deleterious actions of the respective agencies resorted to. In addition, there is lost in the expelled fluid content certain solid matter which should remain in beneficial quantities in the coagulum; therefore, these primitive methods have their disadvantages.

A more advanced practice of coagulation, whereby certain advantages over the older methods are attained, implies coagulation effected by diffusion of the latex in atomized or sprayed form in a current of a dry, heated, gaseous medium, whereby the solid matter is precipitated when the residual fluid is driven out. This process, of course, implies the employing of a rather formidable mechanical equipment.

Being well-informed of the various mechanical and chemical expedients previously resorted to, it has become the principal obect of this invention to effect coagulation of latex by working it in a particular manner admixed with certain coagulation-inducing ingredients which form permanent and desirable elements in the resulting coagulum and in the eventual compound with which the coagulum is to become associated. Another object is to relate the process to the use with latex of a class of coagulation-inducing ingredients of an extremely light powdery texture, (difficult to handle and impossible to compound in a dry state with a rubber coagulum without causing objectionable dust diffusion within the zone in which workers are necessarily occupied) whereby the said ingredients, such as carbon or gas black, are reduced to a conveniently-workable form and thereafter introduced into the latex prior to coagulation, as presently explained.

Specifically this invention is based upon the discovery that the rubber content of latex will unite with and coagulate in the presence of a foreign substance, such as carbon black, which has previously been thoroughly dispersed in a suitable liquid medium, and the resulting mix then subjected to mechanical agitation with or without heat in the manner described, whereby a perfectly dispersed coagulum of the solid content of the latex with practically a complete appropriation of the solid portions of the admixture results.

In order to appreciate the value and novelty of this invention, in particular reference to its specific application to combining gas black, or the like, with a rubber mix, the difficulty in handling this powdery ingredient by conventional methods should be understood. The universal practice has been to add the powdery substance to previously coagulated rubber, which may or may not have been initially treated by milling with other compounding substances, softening oils and the like. Various expedients are practiced; for instance:

The powder may be directly milled into the batch on usual hot mills; the powder and the coagulated rubber batch may be mixed in a suitable mechanical device by violent tearing apart of the rubber particles whereby they become partially surrounded by the powder—the resulting mass then being further softened and unified on hot mills; the powdery ingredient may be moistened with suitable oils or the like prior to mixing with the previously prepared rubber coagulum, the whole thereafter suitably milled into a united batch. Now the above practices are all inevitably attended by some form of disadvantages. In open milling, dust is created to the inconvenience and detriment to the health of operatives. In violent mixing, excessive heat in the mass often results to the detriment of the properties of the mix, and even combustion occasionally results. In all the above processes, a considerable avoidable expense is incurred, and in addition, the dispersion of the powder through the mix is not complete, but a matter of degree only, dependent upon the nature of the operation, the time element, and the skill and judgment displayed by the operator responsible for the result.

The exact reaction by coagulation of the rubber content, held in a colloidal state in the latex, with the admixture of dispersed carbon black is unknown. The phenomena of coagulation, whereby the resulting coagulum presents the collection of practically the entire solid content of both the rubber of the latex and the carbon black in a pasty cohering mass, is apparently chiefly a physical reaction; probably induced by the disturbance of the rubber particles in the latex by the breaking down of their filamentary liquid by the gas black content when the uncoagulated mass is agitated, with or without heat.

As previously stated, my invention recognizes the necessity for thoroughly dispersing the carbon black in a liquid medium prior to introducing it into the latex; but in addition, it has been found that the proportion of gas black to latex must be controlled within certain limits in order that the solid content of both gas black and latex may be successfully recovered in the resulting coagulum. If carbon black were introduced imperfectly dispersed, the coagulum would present agglomerate masses. If improper proportions of carbon black and latex were used, the results would not be satisfactory; showing imperfect coagulation, agglomerate masses, and the like.

When latex is coagulated in the presence of carbon black the resulting coagulum presents a pasty mass in which the carbon black is present in a highly concentrated form. In fact, the initial coagulum is ordinarily too high in carbon black content to serve any useful commercial purpose in that state. The principal object of the specific example, chosen for the purpose of disclosure, is the production of a pigmentary substance to be added to larger quantities of ordinary commercial rubber by conventional methods for the well known purpose of improving its qualities as related to its eventual commercial application.

In the working out of this method of coagulation the following typical example is furnished.

One part by weight of carbon black with about five parts of water is first thoroughly mixed, then added to such quantity of rubber latex that the resulting coagulum will contain two parts by weight of coagulated rubber to one part of carbon black (the exact proportionate amount of latex cannot be definitely determined, except by trial, for the reason that the amount of solid matter in latex is well known to be a variable, dependent upon seasonal growth of the trees, climatic conditions in the plantation, geographical zones, etc.). The mix of dispersed carbon black with latex is then agitated in a moderate manner, with or without superheating, until the mass coagulates. A specific mix, based on the use of latex containing 34½ percent of solid matter, gave excellent results wherein the following weights are used:

|  | Gr. |
|---|---|
| Carbon black | 125 |
| Water | 625 |
| Latex | 725 |

The resulting coagulum above proportioned contained approximately two parts by weight of rubber to one part of carbon black. The residual liquid, when filtered out, showed that practically the entire solid content had become appropriated in the coagulum. In the process of agitating the uncoagulated mass almost any standard liquid mixer can be used and the time of coagulation can be reduced by raising the temperature of the fluid during the mixing to about 160 to 165 degrees Fahrenheit.

While the practice of previously dispersing the carbon black in a liquid can be successfully attained by the use of water alone, a more thorough dispersion of that substance can be attained by adding to the water a suitable quantity of a liquid solution; such as soap, dilute glue or the like. The action of this secondary addition to the water content on the carbon black appears to be analogous to lubrication, whereby the fine particles of carbon black are caused to separate under the influence of agitation, and whereby in their more effectively separated or dispersed state, the intermingling therewith of the solid content of the latex is facilitated—the resulting coagulum showing an unusually high degree of uniform dispersion of the carbon black throughout the mass.

In view of the above disclosure it is apparent that my invention makes available a new and useful method of inducing coagulation of latex in the presence of useful, permanent additions to the resultant product, and that, of equal importance, in a specific example, a pigmentary substance is formed in a new and novel manner whereby all previous disadvantages and imperfections attending its manufacture are removed.

In conclusion, it is noted that, although the terms of the specification appear to specifically define the mixing of the wetted carbon black with the latex, the description should be read broadly enough to include the mixing of the latex with the wetted carbon black. The ultimate result is the same, and the claims should be likewise construed.

Having now described my invention what I claim is:

1. The herein described method of incorporating a comminuted ingredient into rubber comprising the following steps: (a) wetting down and dispersing the comminuted ingredient in a solution wherein the amount of comminuted ingredient shall, by weight, approximately equal one-half of the rubber content of the latex with which it is to become admixed; (b) adding the wetted comminuted ingredient to such quantity of rubber latex, that the solid portion of rubber thereof shall be approximately twice that of the comminuted ingredient, by weight; (c) mechanically agitating the admixed comminuted ingredient and latex until a coagulum is formed containing substantially the whole of the comminuted ingredient and the rubber content of the latex.

2. The herein described method of incorporating a coagulation-inducing pigment into raw rubber, comprising the following steps: (a) effectively dispersing the pigment content in a liquid medium; (b) mixing the dispersed pigment with rubber latex in such proportion that coagulation is induced under agitation; (c) agitating the commingled pigment and latex until a coagulum is formed, separated out of the residual liquid content of the basic ingredients.

3. The herein described method of incorporating a comminuted ingredient into raw rubber, comprising the following steps: (a) effectively dispersing an ascertained quantity of said ingredient in a liquid medium; (b) mixing the dispersed ingredient with such quantity of rubber latex that the solid matter of the ingredient and latex shall be so proportioned that the resulting coagulum will appropriate substantially all such solid matter; (c) agitating the admixed ingredient and latex until a coagulum is formed comprising substantially the solid content of each to the exclusion of substantially the entire liquid mediums thereof.

4. The herein described method of incorporating a coagulation-inducing ingredient into raw rubber, comprising the following steps: (a) effectively dispersing approximately one part, by weight, of the said ingredient in a liquid medium; (b) mixing the dispersed ingredient with rubber latex containing approximately two parts, by weight, of solid rubber content; (c) agitating the commingled ingredient and latex until a coagulum is formed, separated out of the residual content of the said commingled substances.

5. The herein described method of incorporating a coagulation-inducing ingredient into raw rubber, comprising the following steps: (a) effectively dispersing approximately one part, by weight, of the said ingredient in approximately five parts of a liquid medium; (b) mixing the dispersed ingredients with rubber latex containing approximately two parts, by weight, of solid rubber content; (c) agitating the commingled ingredient and latex until a coagulum is formed, separated out of the residual liquid content of said substances.

In testimony whereof I affix my signature.

AUGUST H. PETERSEN.